a2>US011700260B2

(12) United States Patent
Cicchitto

(10) Patent No.: US 11,700,260 B2
(45) Date of Patent: Jul. 11, 2023

(54) METHOD AND APPARATUS FOR NATIVE AUTHENTICATION TO CLOUD SERVICES WITH IDENTITY MANAGEMENT OF ON-PREMISE APPLICATIONS FROM THE CLOUD

(71) Applicant: Nelson A. Cicchitto, San Ramon, CA (US)

(72) Inventor: Nelson A. Cicchitto, San Ramon, CA (US)

( * ) Notice: Subject to any disclaimer, the term of this patent is extended or adjusted under 35 U.S.C. 154(b) by 436 days.

(21) Appl. No.: 16/397,866

(22) Filed: Apr. 29, 2019

(65) Prior Publication Data
US 2019/0334913 A1 Oct. 31, 2019

Related U.S. Application Data

(60) Provisional application No. 62/664,027, filed on Apr. 27, 2018.

(51) Int. Cl.
| | | |
|---|---|---|
| *H04L 9/40* | (2022.01) | |
| *G06F 9/54* | (2006.01) | |
| *H04L 67/1001* | (2022.01) | |

(52) U.S. Cl.
CPC ........... *H04L 63/102* (2013.01); *G06F 9/547* (2013.01); *H04L 63/029* (2013.01); *H04L 63/0884* (2013.01); *H04L 63/20* (2013.01); *H04L 67/1001* (2022.05)

(58) Field of Classification Search
CPC ... H04L 63/102; H04L 63/0884; H04L 63/20; G06F 9/547
See application file for complete search history.

(56) References Cited

U.S. PATENT DOCUMENTS

| | | | | |
|---|---|---|---|---|
| 9,195,374 | B1* | 11/2015 | Meaney | G06F 3/0484 |
| 9,811,322 | B1* | 11/2017 | Sindelar | G06F 8/433 |
| 10,326,845 | B1* | 6/2019 | Jaeger | H04L 41/0806 |
| 10,904,291 | B1* | 1/2021 | Naumann | H04L 63/20 |
| 10,922,284 | B1* | 2/2021 | Venkatasubramanian | G06F 16/1824 |
| 11,108,828 | B1* | 8/2021 | Curtis | H04L 63/20 |

(Continued)

OTHER PUBLICATIONS

Merkel, Docker: Lightweight Linux Containers for Consistent Development and Deployment, Linux J., vol. 2014, No. 239, Mar. 2014, pp. 76-91. (Year: 2014).*

*Primary Examiner* — Matthew Smithers
*Assistant Examiner* — Shu Chun Gao
(74) *Attorney, Agent, or Firm* — Perkins Coie LLP; Michael A. Glenn

(57) ABSTRACT

A technique is provided that enables native authentication to cloud services by employing identity management of on-premise applications from the cloud. More specifically, a Web-service interface built on an innovative orchestration of platform-independent container technology is created. An identity management application is made available inside a container and which therefore can execute in any cloud-service provider. Specifically, this application can communicate back into a business' on-premise applications, using the Representation State Transfer (REST) application programming interface architecture. The container is published to the cloud for users to download. Thus, for example, by way of this technique, a user can log onto any cloud application with using the same logon information the user uses on-premise.

20 Claims, 53 Drawing Sheets

(56) References Cited

U.S. PATENT DOCUMENTS

| | | | | |
|---|---|---|---|---|
| 2012/0233668 A1* | 9/2012 | Leafe | ............ | G06F 9/00 |
| | | | | 726/4 |
| 2016/0057207 A1* | 2/2016 | Li | ............ | H04L 67/10 |
| | | | | 709/203 |
| 2017/0142094 A1* | 5/2017 | Doitch | ............ | H04L 63/102 |
| 2017/0220396 A1* | 8/2017 | Xuan | ............ | G06F 9/546 |
| 2018/0337914 A1* | 11/2018 | Mohamad Abdul | ...... | H04L 9/12 |
| 2019/0058706 A1* | 2/2019 | Feijoo | ............ | H04L 63/0815 |
| 2019/0306227 A1* | 10/2019 | Nuggehalli | ............ | H04L 67/10 |

* cited by examiner

AD

| | | |
|---|---|---|
| | Show/Hide  |  List Operations  |  Expand Operations | |
| GET | /api/v{version}/AD/CheckDC/{dcName} | |

Domains

| | | |
|---|---|---|
| | Show/Hide  |  List Operations  |  Expand Operations | |
| GET | /api/v{version}/Domains/{domainName} | Retrieve AD domain |
| POST | /api/v{version}/Domains/{domainName}/Password | Get a random password that meets the domain's password policy |
| GET | /api/v{version}/Domains/{domainName}/OrganizationalUnits | |
| | Get list of OUs. Normally this would be an HTTP GET action, but the StartFromOu argument can be too large to pass in URL, so this read action is implemented as an HTTP POST in order to pass the request arguments in the request body. | |
| POST | /api/v{version}/Domains/{domainName}/OrganizationalUnits/SingleSearch | |
| | | Search for a single OU via searchKey and searchKeyType in PostSingleOuSearchRequestDto. |
| GET | /api/v{version}/Domains/{domainName}/OrganizationalUnits/{OuGUID} | Retrieve single OU from given AD domain. |
| GET | /api/v{version}/Domains/{domainName}/Users/{searchKey} | Retrieve single AD user |
| GET | /api/v{version}/Domains/{domainName}/UserList | |

*FIG. 6A*

| | | |
|---|---|---|
| GET | /api/v{version}/Domains/{domainName}/Users/multiple | Retrieve multiple AD users |
| PATCH | /api/v{version}/Domains/{domainName}/Users/{samAccountName}/Password | |
| PATCH | /api/v{version}/Domains/{domainName}/Users/{objectGuid}/Status | Change the status of a user (enable/disable/lock) |
| GET | /api/v{version}/Domains/{domainName}/Users/{searchKey}/Tokengroups | Get tokengroups collection for a single AD user |
| GET | /api/v{version}/Domains/{domainName}/Users/{searchKey}/NotificationDetail | Retrieve the details of a specific AD user account that are needed for PSNotify operations. |
| GET | /api/v{version}/Domains/{domainName}/Users/{searchKey}/stringattribute/{attributeName} | Retrieve single string attribute value from specific AD user |
| PATCH | /api/v{version}/Domains/{domainName}/Users/{searchKey}/stringattribute/{attributeName} | Update single string attribute value from specific AD user |
| GET | /api/v{version}/Domains/{domainName}/Users/{searchKey}/stringattributes | For the given AD user, return string values for the given list of AD attributes |
| POST | /api/v{version}/Domains/{domainName}/Users/multiple/stringattributes/search | Retrieve the given list of AD attributes, for all AD users that match the given partial LDAP filter. |
| POST | /api/v{version}/Domains/{domainName}/Users/SingleSearch | Search for a single user via searchKey and searchKeyType in PostSingleUserSearchRequestDto. |

*FIG. 6B*

| Method | Endpoint | Description |
|---|---|---|
| POST | /api/v{version}/Domains/{domainName}/Users/{searchKey}/authentication | Verify that user can authenticate to the domain with the given password |
| GET | /api/v{version}/Domains/{domainName}/Users/{samAccountName}/AccountInfo | Retrieve the AIMS account info for the given userGIUD. |
| GET | /api/v{version}/Domains/{domainName}/Users/{searchKey}/PasswordAge | Retrieve password age information for specific AD user |
| GET | /api/v{version}/Domains/{domainName}/Users/{searchKey}/PasswordExpiration | Retrieve password expiration information for specific AD user |
| GET | /api/v{version}/Domains/{domainName}/Users/{searchKey}/Email | Retrieve email info for a given AD user. |
| GET | /api/v{version}/Domains/{domainName}/Users/{searchKey}/GroupMemberships | |
| GET | /api/v{version}/Domains/{domainName}/Users/{searchKey}/UserAccountControl | Retrieve UserAccountControl information for specific AD user |
| GET | /api/v{version}/Domains/{domainName}/Groups/{searchKey} | Retrieve single AD group |
| GET | /api/v{version}/Domains/{domainName}/Groups/{searchKey}/UserMembers | Retrieve list of base user info for given AD group |
| POST | /api/v{version}/Domains/{domainName}/Computers/{computerName}/Registry/Read | |
| POST | /api/v{version}/Domains/{domainName}/Computers/{computerName}/Registry | |
| DELETE | /api/v{version}/Domains/{domainName}/Groups/{groupGUID}/UserMembers | Remove AD user from AD group. |
| POST | /api/v{version}/Domains/{domainName}/Groups/{groupGUID}/UserMembers | Add AD user to AD group. |

| GET | /api/v{version}/AD/CheckDC/{dcName} | Show/Hide | List Operations | Expand Operations |

Parameters

| Parameter | Value | Description | Parameter Type | Data Type |
|---|---|---|---|---|
| dcName | (required) | | path | string |
| version | (required) | | path | string |

Response Model

Response Messages

| HTTP Status Code | Reason | | | Headers |
|---|---|---|---|---|
| 200 | Success | | | |

Try it out!

*FIG. 7A*

Show/Hide | List Operations | Expand Operations

GET /api/v{version}/Domains/{domainName}  Retrieve AD domain

Implementation Notes

Confirm that agent can connect to given AD domain. If so, return some basic information about the domain.

Response Class (Status 200)

Domain is found. Examine response body for details.

Model | Example Value

```
{
  "name": "string",
  "pdcRoleOwnerDc": "string",
  "currentDc": "string",
  "domainMode": 0,
  "domainModeLevel": 0,
  "upnList": [
    "string"
  ],
  "distinguishedName": "string"
}
```

Response Content Type  application/json ˅

Parameters

| Parameter | Value | Description | Parameter Type | Data Type |
|---|---|---|---|---|
| domainName | (required) | Active Directory domain name | path | string |
| version | (required) | | path | string |

Response Messages

| HTTP Status Code | Reason | Response Model | Headers |
|---|---|---|---|
| 400 | Domain not found or could not be contacted. | | |

Try it out!

*FIG. 7B*

POST /api/v{version}/Domains/{domainName}/Password     Get a random password that meets the domain's password policy

Implementation Notes

Confirm that agent can connect to given AD domain. If so, return some basic information about the domain.

Response Class (Status 200)

Domain is found. Examine response body for details.

Model | Example Value

```
{
  "value": "string"
}
```

Response Content Type [ application/json ▽ ]

Parameters

| Parameter | Value | Description | Parameter Type | Data Type |
|---|---|---|---|---|
| domainName | (required) | Active Directory domain name | path | string |
| requestDto | (required) | | body | Model \| Example Value {"value": "string"} |
| | Parameter content type [ application/json-patch+json ▽ ] | | | |
| version | (required) | | path | string |

Response Messages

| HTTP Status Code | Reason | Response Model | | | Headers |
|---|---|---|---|---|---|
| 400 | Domain not found or could not be contacted. | | | | |

Try it out!

*FIG. 7C*

| GET | /api/v/{version}/Domains/{domainName}/OrganizationalUnits |
|---|---|

Get list of OUs. Normally this would be an HTTP GET action, but the StartFromOu argument can be too large to pass in URL, so this read action is implemented as an HTTP POST in order to pass the request arguments in the request body.

Response Class (Status 200)

OU results are in the response body.

Model | Example Value

```
{
  "returnCode": 0,
  "details": "string",
  "ouList": [
    {
      "objectGuid": "string",
      "name": "string",
      "dn": "string",
      "canonicalName": "string"
    }
  ]
}
```

Response Content Type [ application/json ⌄ ]

Parameters

| Parameter | Value | Description | Parameter Type | Data Type |
|---|---|---|---|---|
| domainName | (required) | Active Directory domain name | path | string |
| StartOuDn |  | The starting OU DN from which to (possibly recursively) return OUs. If left blank, the start at the top level OU in the domain. | header | string |
| IncludeNestedOus |  | Boolean flag for whether nested OUs are to be returned. Defaults to false. If set to true then all OUs beneath the StartOuDn will be returned, otherwise just the OUs directly beneath the StartOuDn will be returned. | query | string |
| version | (required) |  | path | string |

*FIG. 7D-A*

Response Messages

| HTTP Status Code | Reason | Response Model |
|---|---|---|
| 400 | Domain not found or could not be contacted, or could not complete the request. | Model \| Example Value<br>```
{
  "returnCode": 0,
  "details": "string",
  "ouList": [
    {
      "objectGuid": "string",
      "name": "string",
      "dn": "string",
      "canonicalName": "string"
    }
  ]
}
``` |

Headers

Try it out!

*FIG. 7D-B*

| POST | /api/v{version}/Domains/{domainName}/OrganizationalUnits/SingleSearch |
|---|---|

Search for a single OU via searchKey and searchKeyType in PostSingleOuSearchRequestDto.

Response Class (Status 200)
Domain and OU were successfully found. Examine response body for details.

Model | Example Value

```
{
 "objectGuid": "string",
 "name": "string",
 "dn": "string",
 "canonicalName": "string"
}
```

Response Content Type | application/json ▽

Parameters

| Parameter | Value | Description | Parameter Type | Data Type |
|---|---|---|---|---|
| domainName | (required) | | path | string |
| postSingleOuSearchRequestDto | (required) Parameter content type: application/json-patch+json ▽ | structure containing searchkey and searchkey type. Only DN search key type is supported | body | Model \| Example Value <br> { <br> "searchKey": "string", <br> "searchKeyType": "string" <br> } |
| version | (required) | | path | string |

Response Messages

| HTTP Status Code | Reason | Response Model | Headers |
|---|---|---|---|
| 400 | Could not lookup OU based on given information. | | |
| 404 | Could not find any OUs based on input provided. | | |

Try it out!

*FIG. 7E*

| GET | /api/v{version}/Domains/{domainName}/OrganizationalUnits/{OuGUID} | Retrieve single OU from given AD domain. |

Response Class (Status 200)
OU was found in specified domain. Result is in the response body.

Model | Example Value

```
{
  "objectGuid": "string",
  "name": "string",
  "dn": "string",
  "canonicalName": "string"
}
```

Response Content Type [ application/json ∨ ]

Parameters

| Parameter | Value | Description | Parameter Type | Data Type |
|---|---|---|---|---|
| domainName | (required) | Active Directory domain name | path | string |
| OuGUID | (required) | objectGUID of desireed OU | path | string |
| version | (required) | | path | string |

Response Model

Response Messages

| HTTP Status Code | Reason | | | Headers |
|---|---|---|---|---|
| 400 | Could not retrieve an OU with the given information. | | | |
| 404 | No such OU could be found. | | | |

Try it out!

*FIG. 7F*

| GET | /api/v{version}/Domains/{domainName}/Users/{searchKey} | Retrieve single AD user |

Implementation Notes

Attempt to lookup single AD user in given AD domain using the search information provided.

Response Class (Status 200)

Domain is found. Examine response body for details.

Model | Example Value

```
{
  "extended": true,
  "dcName": "string",
  "whenCreated": "2018-04-27T22:58:10.591Z",
  "accountIsDisabled": true,
  "firstName": "string",
  "middleName": "string",
  "initials": "string",
  "lastName": "string",
  "displayName": "string",
  "samAccountName": "string",
  "email": "string",
  "distinguishedName": "string",
  "cn": "string",
  "userPrincipalName": "string",
  "objectSID": "string",
  "objectGUID": "string",
  "accountExpiresOn": "2018-04-27T22:58:10.591Z",
  "accountNeverExpires": true,
  "accountIsExpired": true,
  "lastLogon": "2018-04-27T22:58:10.591Z",
  "lastLogonTimestamp": "2018-04-27T22:58:10.591Z",
  "city": "string",
  "comment": "string",
  "company": "string",
  "country": "string",
  "department": "string",
  "employeeID": "string",
  "employeeNumber": "string",
  "fax": "string",
  "homePhone": "string",
```

*FIG. 7G-A*

```
"mobilePhone": "string",
"primaryTelexNumber": "string",
"office": "string",
"officePhone": "string",
"pager": "string",
"postOfficeBox": "string",
"state": "string",
"title": "string",
"postalCode": "string",
"street": "string",
"locale": "string",
"countryFriendly": "string",
"departmentNumber": "string",
"division": "string",
"businessRoles": "string",
"versionNumber": "string",
"adminDesc": "string",
"employeeType": "string",
"description": "string",
"logonScript": "string",
"extension_Attr_1": "string",
"extension_Attr_2": "string",
"extension_Attr_3": "string",
"extension_Attr_4": "string",
"extension_Attr_5": "string",
"extension_Attr_6": "string",
"extension_Attr_7": "string",
"extension_Attr_8": "string",
"extension_Attr_9": "string",
"extension_Attr_10": "string",
"extension_Attr_11": "string",
"extension_Attr_12": "string",
"extension_Attr_13": "string",
"extension_Attr_14": "string",
"extension_Attr_15": "string",
"personalTitle": "string",
"generationQualifier": "string",
"orgName": "string",
"ipPhone": "string",
"managerDN": "string",
"assistantDN": "string",
```

*FIG. 7G-B*

```
"notes": "string",
"webPage": "string",
"primaryInternationalIsdnNumber": "string",
"otherFax": [
    "string"
],
"otherHomePhone": [
    "string"
],
"otherMobile": [
    "string"
],
"otherPager": [
    "string"
],
"otherTelephone": [
    "string"
]
}
```

Response Content Type [application/json ▽]

Parameters

| Parameter | Value | Description | Parameter Type | Data Type |
|---|---|---|---|---|
| domainName | (required) | Active Directory domain name | path | string |
| searchKey | (required) | Search key for user. | path | string |
| searchKeyType | | Type of search. | query | string |
| extendedAttributes | true ▽ | If set to true, then full set of user attributes are returned in the response. | query | boolean |
| version | (required) | | path | string |

Response Messages

| HTTP Status Code | Reason | Response Model | | Headers |
|---|---|---|---|---|
| 400 | Could not lookup user based on given information. | | | |
| 404 | No such user could be found. | | | |

Try it out!

*FIG. 7G-C*

| GET | /api/{version}/Domains/{domainName}/UserList |

Response Class (Status 200)
Success

Model | Example Value

```
{
  "bulkLookupError": 0,
  "bulkLookupErrorDetails": "string",
  "sidBytes": "string",
  "guidBytes": "string",
  "enrollmentComment": "string",
  "connectorID": 0,
  "userAccountControlFlags": 0,
  "passwordAge": "string",
  "userMustChangePasswordAtNextLogon": true,
  "accountExpiresOnNullable": "2018-04-27T22:58:10.621Z",
  "whenCreatedNullable": "2018-04-27T22:58:10.621Z",
  "lastLogonDateNullable": "2018-04-27T22:58:10.621Z",
  "userDto": {
    "extended": true,
    "dcName": "string",
    "whenCreated": "2018-04-27T22:58:10.621Z",
    "accountIsDisabled": true,
    "firstName": "string",
    "middleName": "string",
    "initials": "string",
    "lastName": "string",
    "displayName": "string",
    "samAccountName": "string",
    "email": "string",
    "distinguishedName": "string",
    "cn": "string",
    "userPrincipalName": "string",
    "objectSID": "string",
    "objectGUID": "string",
    "accountExpiresOn": "2018-04-27T22:58:10.622Z",
    "accountNeverExpires": true,
    "accountIsExpired": true,
    "lastLogon": "2018-04-27T22:58:10.622Z",
```

*FIG. 7H-A*

"lastLogonTimestamp": "2018-04-27T22:58:10.622Z",
"city": "string",
"comment": "string",
"company": "string",
"country": "string",
"department": "string",
"employeeID": "string",
"employeeNumber": "string",
"fax": "string",
"homePhone": "string",
"mobilePhone": "string",
"primaryTelexNumber": "string",
"office": "string",
"officePhone": "string",
"pager": "string",
"postOfficeBox": "string",
"state": "string",
"title": "string",
"postalCode": "string",
"street": "string",
"locale": "string",
"countryFriendly": "string",
"departmentNumber": "string",
"division": "string",
"businessRoles": "string",
"versionNumber": "string",
"adminDesc": "string",
"employeeType": "string",
"description": "string",
"logonScript": "string",
"extension_Attr_1": "string",
"extension_Attr_2": "string",
"extension_Attr_3": "string",
"extension_Attr_4": "string",
"extension_Attr_5": "string",
"extension_Attr_6": "string",
"extension_Attr_7": "string",
"extension_Attr_8": "string",
"extension_Attr_9": "string",
"extension_Attr_10": "string",
"extension_Attr_11": "string",
"extension_Attr_12": "string",

*FIG. 7H-B*

```
"extension_Attr_13": "string",
"extension_Attr_14": "string",
"extension_Attr_15": "string",
"personalTitle": "string",
"generationQualifier": "string",
"orgName": "string",
"ipPhone": "string",
"managerDN": "string",
"assistantDN": "string",
"notes": "string",
"webPage": "string",
"primaryInternationalIsdnNumber": "string",
"otherFax": [
    "string"
],
"otherHomePhone": [
    "string"
],
"otherMobile": [
    "string"
],
"otherPager": [
    "string"
],
"otherTelephone": [
    "string"
]
}
```

Response Content Type  application/json ⌄

Parameters

| Parameter | Value | Description | Parameter Type | Data Type |
|---|---|---|---|---|
| domainName | (required) | | path | string |
| domainAgentKeyID | (required) | | query | integer |
| maxPasswordAgeInSeconds | (required) | | query | integer |

*FIG. 7H-C*

| ldapConnectionTimeoutMs | (required) | query | integer |
| enrollmentDataFieldName | | query | string |
| extendedAttributes | true ∨ | query | boolean |
| collectAll | true ∨ | query | boolean |
| collectUnenrolled | true ∨ | query | boolean |
| isEnrollmentStoredOutsideOfDirectory | true ∨ | query | boolean |
| enrollmentDataFieldFilter | | header | string |
| propertiesToRetrieve | Provide multiple values in new lines. | header | Array[string] |
| version | (required) | path | string |

Try it out!

*FIG. 7H-D*

| GET | /api/v{version}/Domains/{domainName}/Users/multiple | Retrieve multiple AD users |

Implementation Notes

Attempt to lookup multiple AD users in given AD domain using the search information provided.

Response Class (Status 200)

Domain is found. Examine response body for details.

Model | Example Value

```
{
  "extended": true,
  "dcName": "string",
  "whenCreated": "2018-04-27T22:58:10.660Z",
  "accountIsDisabled": true,
  "firstName": "string",
  "middleName": "string",
  "initials": "string",
  "lastName": "string",
  "displayName": "string",
  "samAccountName": "string",
  "email": "string",
  "distinguishedName": "string",
  "cn": "string",
  "userPrincipalName": "string",
  "objectSID": "string",
  "objectGUID": "string",
  "accountExpiresOn": "2018-04-27T22:58:10.660Z",
  "accountNeverExpires": true,
  "accountIsExpired": true,
  "lastLogon": "2018-04-27T22:58:10.660Z",
  "lastLogonTimestamp": "2018-04-27T22:58:10.660Z",
  "city": "string",
  "comment": "string",
  "company": "string",
  "country": "string",
  "department": "string",
  "employeeID": "string",
  "employeeNumber": "string",
  "fax": "string",
  "homePhone": "string",
```

*FIG. 7I-A*

```
"mobilePhone": "string",
"primaryTelexNumber": "string",
"office": "string",
"officePhone": "string",
"pager": "string",
"postOfficeBox": "string",
"state": "string",
"title": "string",
"postalCode": "string",
"street": "string",
"locale": "string",
"countryFriendly": "string",
"departmentNumber": "string",
"division": "string",
"businessRoles": "string",
"versionNumber": "string",
"adminDesc": "string",
"employeeType": "string",
"description": "string",
"logonScript": "string",
"extension_Attr_1": "string",
"extension_Attr_2": "string",
"extension_Attr_3": "string",
"extension_Attr_4": "string",
"extension_Attr_5": "string",
"extension_Attr_6": "string",
"extension_Attr_7": "string",
"extension_Attr_8": "string",
"extension_Attr_9": "string",
"extension_Attr_10": "string",
"extension_Attr_11": "string",
"extension_Attr_12": "string",
"extension_Attr_13": "string",
"extension_Attr_14": "string",
"extension_Attr_15": "string",
"personalTitle": "string",
"generationQualifier": "string",
"orgName": "string",
"ipPhone": "string",
"managerDN": "string",
"assistantDN": "string",
```

*FIG. 7I-B*

```
"notes": "string",
"webPage": "string",
"primaryInternationalIsdnNumber": "string",
"otherFax": [
    "string"
],
"otherHomePhone": [
    "string"
],
"otherMobile": [
    "string"
],
"otherPager": [
    "string"
],
"otherTelephone": [
    "string"
]
}
```

Response Content Type: application/json ⌄

Parameters

| Parameter | Value | Description | Parameter Type | Data Type |
|---|---|---|---|---|
| domainName | (required) | Active Directory domain name | path | string |
| partialLdapFilter | (required) | Partial LDAP filter to look up users. | header | string |
| maxReturnLimit | (required) | The maximum users that may be returned in the list. If more users match the provided partialLdapFilter, then they will be ignored and not returned. A non-positive value of maxReturnLimit means return all. | query | integer |
| extendedAttributes | true ⌄ | If set to true, then full set of user attributes are returned in the response. | query | boolean |
| version | (required) |  | path | string |

Response Model

Response Messages

| HTTP Status Code | Reason |
|---|---|
| 400 | Could not lookup user based on given information. |
| 404 | No such user could be found. |

Try it out!

*FIG. 7I-C*

PATCH /api/{version}/Domains/{domainName}/Users/{samAccountName}/Password

Response Class (Status 200)
Success

Model | Example Value

```
{
  "returnCode": 0,
  "errorMessage": "string",
  "debugDetails": "string",
  "setPasswordStatus": 0
}
```

Response Content Type | application/json ∨

Parameters

| Parameter | Value | Description | Parameter Type | Data Type |
|---|---|---|---|---|
| domainName | (required) | | path | string |
| samAccountName | (required) | | path | string |
| requestDto | | | body | Model \| Example Value <br> ```{ "operation": "string", "oldPassword": "string", "newPassword": "string", "ignoreADUserCannotChangePassword": true, "minPasswordLength": 0, "minNomAlphaCharsInPassword": 0, "calledFromFlags": 0, "doesDomainHonorPasswordAge": true, "doesDomainHonorPasswordHistory": true, "mustChangePassword": true, "performPreCheckMinPasswordLength": true }``` |

Parameter content type | application/json-patch+json ∨

*FIG. 7J-A* version | (required) | path | string

Response Messages

| HTTP Status Code | Reason | Response Model | | Headers |
|---|---|---|---|---|
| 400 | Bad Request | Model \| Example Value | | |
| | | { <br> "returnCode": 0, <br> "errorMessage": "string", <br> "debugDetails": "string", <br> "setPasswordStatus": 0 <br> } | | |
| 404 | Not Found | Model \| Example Value | | |
| | | { <br> "returnCode": 0, <br> "errorMessage": "string", <br> "debugDetails": "string", <br> "setPasswordStatus": 0 <br> } | | |

Try it out!

*FIG. 7J-B*

| PATCH | /api/v/{version}/Domains/{domainName}/Users/{objectGuid}/Status | Change the status of a user (enable/disable/lock) |

Response Class (Status 200)

Operation was successfully performed against the specified user. Examine response body for details.

Model | Example Value

```
{
  "returnCode": 0,
  "details": "string"
}
```

Response Content Type [ application/json ∨ ]

Parameters

| Parameter | Value | Description | Parameter Type | Data Type |
|---|---|---|---|---|
| domainName | (required) | Active Directory domain name | path | string |
| objectGuid | (required) | The objectGuid value of the user in the domain | path | string |
| requestDto | | | body | Model \| Example Value<br>`{ "operation": "string" }` |

Parameter content type [ application/json-patch+json ∨ ]

| version | (required) | | path | string |

*FIG. 7K-A*

Response Messages

| HTTP Status Code | Reason | Response Model |
|---|---|---|
| 400 | Could not lookup user based on given information. | Model \| Example Value<br>{<br>"returnCode": 0,<br>"details": "string"<br>} |
| 404 | No such user could be found | Model \| Example Value<br>{<br>"returnCode": 0,<br>"details": "string"<br>} |

Headers

Try it out!

*FIG. 7K-B*

| GET | /api/v{version}/Domains/{domainName}/Users/{searchKey}/Tokengroups | Get tokengroups collection for a single AD user |

Response Class (Status 200)
User was found in given domain. Examine response body for list of user's tokengroups SID values.

Model | Example Value

```
[
  "string"
]
```

Response Content Type | application/json ⌄

Parameters

| Parameter | Value | Description | Parameter Type | Data Type |
|---|---|---|---|---|
| domainName | (required) | Active Directory domain name | path | string |
| searchKey | (required) | Search key for user. | path | string |
| searchKeyType | | Type of search. | query | string |
| version | (required) | | path | string |

Response Model | | | | Headers

Response Messages

| HTTP Status Code | Reason |
|---|---|
| 400 | Could not lookup user based on given information. |
| 404 | No such user could be found. |

Try it out!

*FIG. 7L*

| GET | /api/v{version}/Domains/{domainName}/Users/{searchKey}/NotificationDetail |

Retrieve the details of a specific AD user account that are needed for PSNotify operations.

Response Class (Status 200)

Domain is found. Examine response body for details.

Model | Example Value

```
{
  "samAccountName": "string",
  "distinguishedName": "string",
  "userAccountControl": 0,
  "userPasswordAgeInSeconds": 0,
  "homeMDB": "string",
  "proxyAddresses": [
    "string"
  ],
  "accountExpires": {
    "dateTimeValue": "2018-04-27T22:58:10.745Z",
    "status": 0
  },
  "mail": "string",
  "objectGUID": "string",
  "userCannotChangePwd": true
}
```

Response Content Type | application/json ⌄

Parameters

| Parameter | Value | Description | Parameter Type | Data Type |
|---|---|---|---|---|
| domainName | (required) | Active Directory domain name | path | string |
| searchKey | (required) | Search key for user. | path | string |
| searchKeyType | | Type of search. | query | string |
| version | (required) | | path | string |

*FIG. 7M-A*

Response Messages

| HTTP Status Code | Reason | Response Model | Headers |
|---|---|---|---|
| 400 | Bad request | | |
| 404 | No such user could be found. | | |

Try it out!

*FIG. 7M-B*

| GET | /api/v{version}/Domains/{domainName}/Users/{searchKey}/stringattribute/{attributeName} |
|---|---|
| | Retrieve single string attribute value from specific AD user |

Response Class (Status 200)

Domain is found. Examine response body for value of requested attribute. If attribute was not valid, then empty string is returned as a response.

Model | Example Value

```
{
  "principalGuid": "string",
  "attributeName": "string",
  "attributeValue": "string"
}
```

Response Content Type [ application/json ⌄ ]

Parameters

| Parameter | Value | Description | Parameter Type | Data Type |
|---|---|---|---|---|
| domainName | (required) | Active Directory domain name | path | string |
| searchKey | (required) | Search key for user. | path | string |
| attributeName | (required) | Name of attribute caller wants value for. | path | string |
| searchKeyType | | Type of search. | query | string |
| attributeIndex | (required) | | query | integer |
| version | (required) | | path | string |

Response Messages

| HTTP Status Code | Reason | Response Model | Headers |
|---|---|---|---|
| 400 | Could not lookup user based on given information. | | |
| 404 | No such user could be found. | | |

Try it out!

*FIG. 7N*

PATCH /api/v{version}/Domains/{domainName}/Users/{searchKey}/stringattribute/{attributeName}

Update single string attribute value from specific AD user

Response Class (Status 200)
User was found in specified domain, attribute was successfully updated.

Model | Example Value

```
{
  "returnCode": 0,
  "details": "string"
}
```

Response Content Type [ application/json ∨ ]

Parameters

| Parameter | Value | Description | Parameter Type | Data Type |
|---|---|---|---|---|
| domainName | (required) | Active Directory domain name | path | string |
| searchKey | (required) | Search key for user. | path | string |
| attributeName | (required) | Name of attribute to change. | path | string |
| patchStringAttributeRequestDto | (required) | structure holding new attribute value. | body | Model \| Example Value <br> `{ "searchKeyType": "string", "attributeValue": "string" }` |
| | Parameter content type [ application/json-patch+json ∨ ] | | | |
| version | (required) | | path | string |

Response Messages

| HTTP Status Code | Reason | Response Model | Headers |
|---|---|---|---|
| 400 | Could update attr. | | |
| 404 | No such user could be found. | | |

Try it out!

*FIG. 70*

| GET | /api/v/{version}/Domains/{domainName}/Users/{searchKey}/stringattributes |
|---|---|
| | For the given AD user, return string values for the given list of AD attributes |

Response Class (Status 200)
Success

Model | Example Value

{ }

Response Content Type | application/json ⌄

Parameters

| Parameter | Value | Description | Parameter Type | Data Type |
|---|---|---|---|---|
| domainName | (required) | Active Directory domain name | path | string |
| searchKey | (required) | Search key for user. | path | string |
| attrJsonList | | Name of header attribute that hold the structure of the desired AD attributes to lookup | header | string |
| searchKeyType | | Type of search. | query | string |
| version | (required) | | path | string |

Response Messages

| HTTP Status Code | Reason | Response Model | Headers |
|---|---|---|---|
| 400 | Bad Request | | |
| 404 | Not Found | | |

Try it out!

*FIG. 7P*

| POST | /api/v{version}/Domains/{domainName}/Users/multiple/stringattributes/search |
|---|---|
| | Retrieve the given list of AD attributes, for all AD users that match the given partial LDAP filter. |

Response Class (Status 200)
Success

Model | Example Value

```
[
 {}
]
```

Response Content Type | application/json ∨

Parameters

| Parameter | Value | Description | Parameter Type | Data Type |
|---|---|---|---|---|
| domainName | (required) | Active Directory domain name | path | string |
| postMultipleUserSearchRequestDto | | holds desired attribute list, and partial ldap filter to lookup users, and maxreturnlimit | body | Model \| Example Value<br>{ "attributeList": [<br>"string"<br>],<br>"partialUserLdapFilter": "string",<br>"maxReturnLimit": 0<br>} |
| | Parameter content type | application/json-patch+json ∨ | | |
| version | (required) | | path | string |

Response Messages

| HTTP Status Code | Reason | Response Model | Headers |
|---|---|---|---|
| 400 | Bad Request | | |
| 404 | Not Found | | |

Try it out!

*FIG. 7Q*

| POST | /api/v{version}/Domains/{domainName}/Users/SingleSearch |
|---|---|

Search for a single user via searchKey and searchKeyType in PostSingleUserSearchRequestDto.

Response Class (Status 200)
Domain and user were successfully found. Examine response body for details.

Model | Example Value

```
{
  "objectGUID": "string",
  "objectSID": "string",
  "samAccountName": "string",
  "userPrincipalName": "string",
  "mail": "string"
}
```

Response Content Type [ application/json ▽ ]

Parameters

| Parameter | Value | Description | Parameter Type | Data Type |
|---|---|---|---|---|
| domainName | (required) | Active Directory domain name | path | string |
| postSingleUserSearchRequestDto | | structure containing searchkey and searchkey type. Only LDAP filter and DN search key types are supported. | body | Model \| Example Value<br>{<br>"searchKey": "string",<br>"searchKeyType": "string"<br>} |
| | Parameter content type [ application/json-patch+json ▽ ] | | | |
| version | (required) | | path | string |

Response Messages

| HTTP Status Code | Reason | Response Model | Headers |
|---|---|---|---|
| 400 | Could not lookup user based on given information. | | |
| 404 | Could not find any users based on input provided. | | |

[ Try it out! ]

*FIG. 7R*

POST /api/v{version}/Domains/{domainName}/Users/{searchKey}/authentication

Verify that user can authenticate to the domain with the given password

Response Class (Status 200)
User was found in specified domain, password was tested.
Response body will show result of ReturnCodes.SUCCESS, ReturnCodes.BAD_PASSWORD, or ReturnCodes.ACCOUNT_SOFT_LOCKED.

Model | Example Value

```
{
  "returnCode": 0,
  "details": "string"
}
```

Response Content Type [ application/json ▽ ]

Parameters

| Parameter | Value | Description | Parameter Type | Data Type |
|---|---|---|---|---|
| domainName | (required) | Active Directory domain name | path | string |
| searchKey | (required) | Search key for user. | path | string |
| postAuthRequestDto | | structure holding request attributes. | body | Model \| Example Value<br>{<br>"searchKeyType": "string",<br>"password": "string"<br>} |
| | Parameter content type [ application/json-patch+json ▽ ] | | | |
| version | (required) | | path | string |

Response Messages

| HTTP Status Code | Reason | Response Model | Headers |
|---|---|---|---|
| 400 | Could not test password. | | |
| 404 | No such user could be found. | | |

Try it out!

*FIG. 7S*

| GET | /api/v{version}/Domains/{domainName}/Users/{samAccountName}/AccountInfo | Retrieve the AIMS account info for the given userGIUD. |

Response Class (Status 200)
Domain is found. Examine response body for details.

Model | Example Value

```
{
  "dcName": "string",
  "accountExpires": {
    "dateTimeValue": "2018-04-27T22:44:33.772Z",
    "status": 0
  },
  "accountStatus": 0,
  "displayName": "string"
}
```

Response Content Type [ application/json ∨ ]

Parameters

| Parameter | Value | Description | Parameter Type | Data Type |
|---|---|---|---|---|
| domainName | (required) | Active Directory domain name | path | string |
| samAccountName | (required) | The samAccountName value of the user in the domain | path | string |
| ignoreADUserCannotChangePassword | true ∨ | | query | boolean |
| version | (required) | | path | string |

Response Messages

| HTTP Status Code | Reason | Response Model | Headers |
|---|---|---|---|
| 404 | No such user could be found. | | |

[ Try it out! ]

*FIG. 7T*

| GET | /api/v{version}/Domains/{domainName}/Users/{searchKey}/PasswordAge | Retrieve password age information for specific AD user |

Response Class (Status 200)
Domain is found. Examine response body details.

Model | Example Value

```
{
  "dcName" : "string",
  "passwordAge" : 0
}
```

Response Content Type [ application/json ▽ ]

Parameters

| Parameter | Value | Description | Parameter Type | Data Type |
|---|---|---|---|---|
| domainName | (required) | Active Directory domain name | path | string |
| searchKey | (required) | Search key for user. | path | string |
| searchKeyType | | Type of search. | query | string |
| version | (required) | | path | string |

Response Messages

| HTTP Status Code | Reason | Response Model | Headers |
|---|---|---|---|
| 400 | Could not lookup user based on given information. | | |
| 404 | No such user could be found. | | |

Try it out!

*FIG. 7U*

| GET | /api/v{version}/Domains/{domainName}/Users/{searchKey}/PasswordExpiration | Retrieve password expiration information for specific AD user |

Response Class (Status 200)
Domain is found. Examine response body details.

Model | Example Value

```
{
  "passwordExpiration": {
    "dateTimeValue": "2018-04-27T22:44:33.800Z",
    "status": 0
  }
}
```

Response Content Type [ application/json ∨ ]

Parameters

| Parameter | Value | Description | Parameter Type | Data Type |
|---|---|---|---|---|
| domainName | (required) | Active Directory domain name | path | string |
| searchKey | (required) | Search key for user. | path | string |
| searchKeyType | | Type of search. | query | string |
| version | (required) | | path | string |

Response Model

Response Messages

| HTTP Status Code | Reason | | | Headers |
|---|---|---|---|---|
| 400 | Could not lookup user based on given information. | | | |
| 404 | No such user could be found. | | | |

[ Try it out! ]

*FIG. 7V*

| GET | /api/{version}/Domains/{domainName}/Users/{searchKey}/Email | Retrieve email info for a given AD user. |

Response Class (Status 200)
Domain is found. Examine response body details.

Model | Example Value

```
{
  "mail": "string",
  "homeMDB": "string",
  "proxyAddresses": [
    "string"
  ]
}
```

Response Content Type  application/json ⌄

Parameters

| Parameter | Value | Description | Parameter Type | Data Type |
|---|---|---|---|---|
| domainName | (required) | Active Directory domain name | path | string |
| searchKey | (required) | Search key for user. | path | string |
| searchKeyType | | Type of search. | query | string |
| version | (required) | | path | string |

Response Messages

| HTTP Status Code | Reason | Response Model | Headers |
|---|---|---|---|
| 400 | Could not lookup user based on given information. | | |
| 404 | No such user could be found. | | |

Try it out!

*FIG. 7W*

| GET | /api/v{version}/Domains/{domainName}/Users/{searchKey}/GroupMemberships |

Response Class (Status 200)
Success
Model | Example Value

```
[
  {
    "samAccountName": "string",
    "name": "string",
    "distinguishedName": "string",
    "displayName": "string",
    "description": "string",
    "groupScope": 0,
    "isSecurityGroup": true,
    "objectSID": "string",
    "objectGUID": "string"
  }
]
```

Response Content Type [ application/json ⌄ ]

Parameters

| Parameter | Value | Description | Parameter Type | Data Type |
|---|---|---|---|---|
| domainName | (required) | | path | string |
| searchKey | (required) | | path | string |
| searchKeyType | | | query | string |
| version | (required) | | path | string |

Response Messages

| HTTP Status Code | Reason | Response Model | Headers |
|---|---|---|---|
| 400 | Bad Request | | |
| 404 | Not Found | | |

[ Try it out! ]

*FIG. 7X*

| GET | /api/v{version}/Domains/{domainName}/Users/{searchKey}/UserAccountControl | Retrieve UserAccountControl information for specific AD user |

Response Class (Status 200)
Domain is found. Examine response body details.

Model | Example Value

```
{
  "userAccountControl": 0
}
```

Response Content Type [ application/json ∨ ]

Parameters

| Parameter | Value | Description | Parameter Type | Data Type |
|---|---|---|---|---|
| domainName | (required) | Active Directory domain name | path | string |
| searchKey | (required) | Search key for user. | path | string |
| searchKeyType |  | Type of search. | query | string |
| version | (required) |  | path | string |

Response Messages

| HTTP Status Code | Reason | Response Model | Headers |
|---|---|---|---|
| 400 | Could not lookup user based on given information. |  |  |
| 404 | No such user could be found. |  |  |

Try it out!

*FIG. 7Y*

| GET | /api/v{version}/Domains/{domainName}/Groups/{searchKey} | Retrieve single AD group |

Implementation Notes

Attempt to lookup single AD group in given AD domain using the search information provided.

Response Class (Status 200)

Domain is found. Examine response body for details.

Model | Example Value

```
{
  "extended": true,
  "dcName": "string",
  "whenCreated": "2018-04-27T22:44:33.856Z",
  "accountIsDisabled": true,
  "firstName": "string",
  "middleName": "string",
  "initials": "string",
  "lastName": "string",
  "displayName": "string",
  "samAccountName": "string",
  "email": "string",
  "distinguishedName": "string",
  "cn": "string",
  "userPrincipalName": "string",
  "objectSID": "string",
  "objectGUID": "string",
  "accountExpiresOn": "2018-04-27T22:44:33.856Z",
  "accountNeverExpires": true,
  "accountIsExpired": true,
  "lastLogon": "2018-04-27T22:44:33.856Z",
  "lastLogonTimestamp": "2018-04-27T22:44:33.856Z",
  "city": "string",
  "comment": "string",
  "company": "string",
  "country": "string",
  "department": "string",
  "employeeID": "string",
  "employeeNumber": "string",
  "fax": "string",
  "homePhone": "string",
```

*FIG. 7Z-A*

"mobilePhone": "string",
"primaryTelexNumber": "string",
"office": "string",
"officePhone": "string",
"pager": "string",
"postOfficeBox": "string",
"state": "string",
"title": "string",
"postalCode": "string",
"street": "string",
"locale": "string",
"countryFriendly": "string",
"departmentNumber": "string",
"division": "string",
"businessRoles": "string",
"versionNumber": "string",
"adminDesc": "string",
"employeeType": "string",
"description": "string",
"logonScript": "string",
"extension_Attr_1": "string",
"extension_Attr_2": "string",
"extension_Attr_3": "string",
"extension_Attr_4": "string",
"extension_Attr_5": "string",
"extension_Attr_6": "string",
"extension_Attr_7": "string",
"extension_Attr_8": "string",
"extension_Attr_9": "string",
"extension_Attr_10": "string",
"extension_Attr_11": "string",
"extension_Attr_12": "string",
"extension_Attr_13": "string",
"extension_Attr_14": "string",
"extension_Attr_15": "string",
"personalTitle": "string",
"generationQualifier": "string",
"orgName": "string",
"ipPhone": "string",
"managerDN": "string",
"assistantDN": "string",

*FIG. 7Z-B*

```
"notes": "string",
"webPage": "string",
"primaryInternationalIsdnNumber": "string",
"otherFax": [
    "string"
],
"otherHomePhone": [
    "string"
],
"otherMobile": [
    "string"
],
"otherPager": [
    "string"
],
"otherTelephone": [
    "string"
]
}
```

*FIG. 7Z-C*

| GET | /api/{version}/Domains/{domainName}/Groups/{searchKey}/UserMembers | Retrieve list of base user info for given AD group |

Response Class (Status 200)
Domain is found. Examine response body for details.

Model | Example Value

```
{
  "displayName": "string",
  "samAccountName": "string",
  "email": "string",
  "userPrincipalName": "string",
  "objectSID": "string",
  "objectGUID": "string"
}
```

Response Content Type | application/json ∨

Parameters

| Parameter | Value | Description | Parameter Type | Data Type |
|---|---|---|---|---|
| domainName | (required) | Active Directory domain name | path | string |
| searchKey | (required) | Search key for group. | path | string |
| searchKeyType |  | Type of search. | query | string |
| includedNested | true ∨ | Honor nested groups when determining group memberships | query | boolean |
| version | (required) |  | path | string |

Response Messages

| HTTP Status Code | Reason | Response Model | Headers |
|---|---|---|---|
| 400 | Could not lookup group based on given information. | | |
| 404 | No such group could be found. | | |

Try it out!

*FIG. 7AA*

POST /api/v{version}/Domains/{domainName}/Computers/{computerName}/Registry/Read

Response Class (Status 200)
Desired registry entry is found. Examine response body for details.

Model | Example Value

```
{
  "value": "string",
  "type": "string"
}
```

Response Content Type [ application/json ▽ ]

Parameters

| Parameter | Value | Description | Parameter Type | Data Type |
|---|---|---|---|---|
| domainName | (required) | Active Directory domain name | path | string |
| computerName | (required) | ComputerName of registry | path | string |
| postRegistryRequestDto | | desired hivename, registrykey, attribute etc. to read | body | Model \| Example Value `{ "hiveName": "string", "subKey": "string", "attributeName": "string", "attributeValue": "string" }` |
| | Parameter content type [ application/json-patch+json ▽ ] | | | |
| version | (required) | | path | string |

Response Messages

| HTTP Status Code | Reason | Response Model | Headers |
|---|---|---|---|
| 400 | Could not complete request. | | |

[ Try it out! ]

*FIG. 7AB*

POST /api/v{version}/Domains/{domainName}/Computers/{computerName}/Registry

Parameters

| Parameter | Value | Description | Parameter Type | Data Type |
|---|---|---|---|---|
| domainName | (required) | | path | string |
| computerName | (required) | | path | string |
| postRegistryRequestDto | | | body | Model \| Example Value<br>{<br>"hiveName": "string",<br>"subKey": "string",<br>"attributeName": "string",<br>"attributeValue": "string"<br>} |

Parameter content type: application/json-patch+json ▾

| Parameter | Value | Description | Parameter Type | Data Type |
|---|---|---|---|---|
| version | (required) | | path | string |

Response Messages

| HTTP Status Code | Reason | Response Model | Headers |
|---|---|---|---|
| 200 | Success | | |
| 400 | Bad Request | | |
| 404 | Not Found | | |

Try it out!

*FIG. 7AC*

DELETE /api/v{version}/Domains/{domainName}/Groups/{groupGUID}/UserMembers     Remove AD user from AD group.

Parameters

| Parameter | Value | Description | Parameter Type | Data Type |
|---|---|---|---|---|
| domainName | (required) | Active Directory domain name | path | string |
| groupGUID | (required) | ObjectGUID of group to modify. | path | string |
| postRemoveUserFromGroupDto | | structure holding ObjectGUID of AD user to remove from group. | body | Model \| Example Value<br>{<br>"userGUID":"string"<br>} |
| | Parameter content type | application/json-patch+json ∨ | | |
| version | (required) | | path | string |

Response Messages

| HTTP Status Code | Reason | Response Model | Headers |
|---|---|---|---|
| 200 | Request was successfully completed. | | |
| 400 | Could not execute request. | | |
| 404 | No such group could be found. | | |

Try it out!

*FIG. 7AD*

| POST | /api/v{version}/Domains/{domainName}/Groups/{groupGUID}/UserMembers | | | Add AD user to AD group. |
|---|---|---|---|---|

Parameters

| Parameter | Value | Description | Parameter Type | Data Type |
|---|---|---|---|---|
| domainName | (required) | Active Directory domain name | path | string |
| groupGUID | (required) | ObjectGUID of group to modify. | path | string |
| postAddUserToGroupRequesDto | | structure holding ObjectGUID of AD user to add to group. | body | Model \| Example Value<br>{<br>"userGUID":"string"<br>} |
| | Parameter content type  application/json-patch+json ⌄ | | | |
| version | (required) | | path | string |

Response Messages

| HTTP Status Code | Reason | Response Model | | Headers |
|---|---|---|---|---|
| 200 | Request was successfully completed. | | | |
| 400 | Could not execute request. | | | |
| 404 | No such group could be found. | | | |

Try it out!

*FIG. 7AE*

METHOD AND APPARATUS FOR NATIVE AUTHENTICATION TO CLOUD SERVICES WITH IDENTITY MANAGEMENT OF ON-PREMISE APPLICATIONS FROM THE CLOUD

CROSS REFERENCE TO RELATED APPLICATIONS

This patent application claims priority from U.S. provisional patent application Ser. No. 62/664,027, NATIVE AUTHENTICATION TO CLOUD SERVICES WITH IDENTITY MANAGEMENT OF ON-PREMISE APPLICATIONS FROM THE CLOUD, filed Apr. 27, 2018, the entirety of which is incorporated herein by this reference thereto.

BACKGROUND OF THE INVENTION

Technical Field

This invention relates generally to the field of authentication to cloud services. More specifically, this invention relates to native authentication to cloud services with identity management of on-premise applications from the cloud.

Description of the Related Art

Currently, many businesses typically operate by implementing back-office applications and using various company assets. Each application or asset is managed separately, resulting in added complexity to employees, partners, and customers. It has been found that this present paradigm can impede progress, as these businesses require a complex framework of multiple policies and technologies for securely provisioning and managing users and assets.

Also, the operations of these businesses typically execute on a numerous variety of operating systems, which also adds to the complexity of provisioning. Solutions offered by present day virtual machine products allow multiple operating systems to exist on the same machine. However, such operating systems are large, which results in the business only being able to fit a fixed number of virtual machine operating systems inside of the operating system of the business' computer or server.

Another limitation with using virtual machines is that each operating system has to be patched. Thus, if a user is running an application on one of the operating systems in the virtual machine environment and a patch to the operating system is implemented, such patch may cause the application to become unstable or may introduce a vulnerability that could cause the application to crash and not work. For instance, suppose the application for calculating the number Pi is running on a virtual machine operating system. Suppose further that that operating system requires a patch. Subsequently, the user has to stop and install the patch, which pauses the application. Further, the patch may require the system to reboot. Such interruption may even cause the application not to be available any longer.

SUMMARY OF THE INVENTION

A technique is provided that enables native authentication to cloud services by employing identity management of on-premise applications from the cloud. More specifically, a Web-service interface built on an innovative orchestration of platform-independent container technology is created. An identity management application is made available inside a container and which therefore can execute in any cloud-service provider. Specifically, this application can communicate back into a business' on-premise applications, using the Representation State Transfer (REST) application programming interface architecture. The container is published to the cloud for users to download. Thus, for example, by way of this technique, a user can log onto any cloud application with using the same logon information the user uses on-premise.

BRIEF DESCRIPTION OF THE DRAWINGS

FIGS. 6A-6C is a list of application programming interfaces (APIs) for the operating-system-level container environments, according to an embodiment;

FIGS. 7A-7AE is a schematic diagram of the commands for each of the APIs of FIGS. 6A-6C, according to an embodiment.

DETAILED DESCRIPTION

Figure 1:
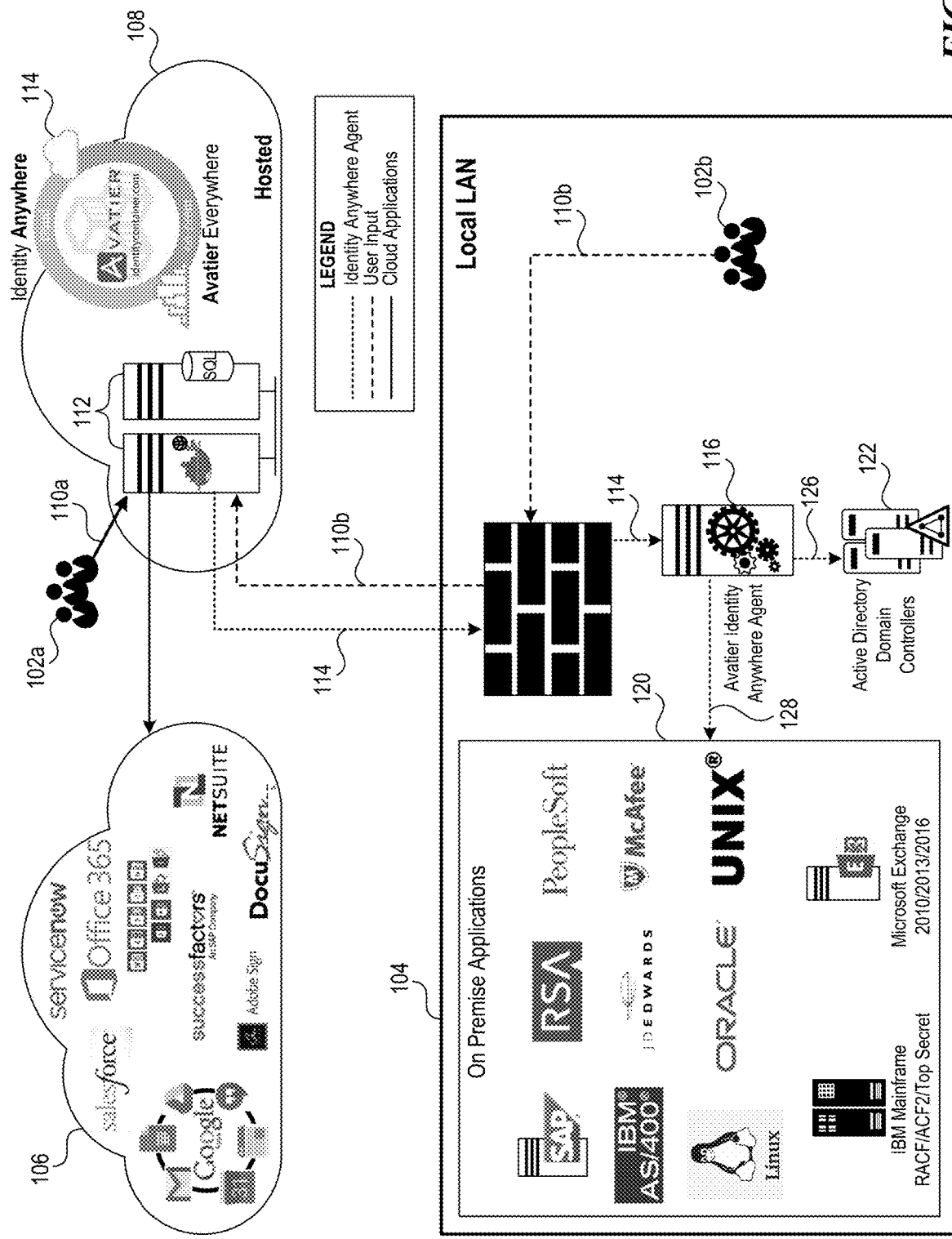
FIG. 1 is a schematic diagram of an application container hosted environment for identity management, according to an embodiment.

A technique is provided that enables native authentication to cloud services by employing identity management of on-premise applications from the cloud. More specifically, a Web-service interface built on an innovative orchestration of platform-independent container technology is created. An identity management application is made available inside a container and which therefore can execute in any cloud-service provider. Specifically, this application can communicate back into a business' on-premise applications, using the Representation State Transfer (REST) application programming interface architecture. The container is published to the cloud for users to download. Thus, for example, by way of this technique, a user can log onto any cloud application with using the same logon information the user uses on-premise.

Identity Management Application is Device Independent

An embodiment provides an identity management mechanism based on container technology. Container technology enables a portable container to be installed or downloaded to any compatible operating system, such as Linux (open-source software operating systems based on the Linux kernel; Developer: Linus Torvalds and collaborators), Windows (Microsoft, Redmond, Wash.), macOS (Apple Inc., Cupertino, Calif.). A container as used herein can be defined as a package of code and metadata allowing an application to execute quickly and reliably from one computing environment to another. An example of container technology is that developed by Docker, Inc. (San Francisco, Calif.). An implementation of container technology can be understood herein by referring to the Docker container platform. Specifically, a Docker container image is a lightweight, stand-alone, executable package of software that includes everything needed to run an application: code, runtime, system tools, system libraries and settings. Thus, when compared to other virtual machine environments that only allow four or so operation systems to be installed within a main operating system, the platform with application containers allow tens of application containers to be deployed within the main operating system. Put another way, a Docker platform enables the deploying of and running of applications by use of containers. It should be appreciated that each container can be considered a self-contained computing environment. Many containers on the same server can be run simultaneously. Also, by using application container technology, an application within the container runs independent of the hardware. For instance, an identity management application inside such container is configured to run on any of: a smartphone, a digital tablet, a network-connected digital television, a game station, or any platform for streaming entertainment, and so on.

In an embodiment, with container application technology, such as Docket container technology, orchestration is added. Such provided orchestration allows the innovation to run multiple servers or applications, multiple instances of the same application on that one server and coordinate the load balancing automatically, e.g. increasing CPU or increasing memory or spinning up a new server, and so on. In other words, container application technology can coordinate automatically. In an embodiment, the application container innovation is provided with continuous delivery so that the systems never has to be shut down or shut down the application. Users can be assured that they are on the latest version.

Identity Management Application can Run in any Cloud Service Provider

It should be appreciated that because the identity application is provided in a container, then such application can run in any cloud-service provider. For example, the same innovative identity management delivered via container can run in Amazon Web Services (Amazon Web Services, Inc., Seattle, Wash.), Microsoft Azure (Microsoft Corporation, Redmond, Wash.), Google (Google LLC, Mountain View, Calif.), IBM (Armonk, N.Y.), Oracle (Oracle Corporation, Redwood City, Calif.), or DigitalOcean (New York City, N.Y.), etc. According to an embodiment, the identity management application is not dependent on which cloud service provider hosts it, as it is completely independent.

Identity Management Application can Run on-Premise

In an embodiment, the identity management application can run on-premise. For purposes of understanding herein, on-premise refers to an application being hosted in the business' network environment on their premises. Importantly, such identity management application is configured to run on-premise the same way as hosted elsewhere. Thus, in accordance with embodiments herein, the on-premise application is managed and supported as a cloud application.

Application Container is Published

In an embodiment and in either the on-premise environment or cloud, there is no concept or requirement of an install. The operation of the identity management application is based on stop-and-start. In an embodiment, the identity management contain is published out to the cloud in either a private or public repository and users simply download such container and start it. There is no installation involved.

Identity Management Application Communication with on-Premise Applications

In an embodiment, the identity management application is configured to communicate back into the entity's, e.g. business', already existing or newly created on-premise applications. For instance, such on-premise applications can exist on the mainframe, on the AS100 router (Cisco Systems, San Jose, Calif.), in the Windows Active Directory environment, in the Lightweight Directory Access Protocol (LDAP) environment, e.g. PeopleSoft or J. D. Edwards & Company (parent company to both is Oracle Corporation). Active Directory, as understood herein, refers to a domain controller server-database that authenticates and authorizes users for devices on a network in a Windows environment. LDAP as understood herein refers is the application protocol for querying and modifying items in directory service providers such as but not limited to Active Directory.

With reference to FIG. 6A-6C, a list of application programming interfaces (APIs) for the operating-system-level container environments, and in accordance with an embodiment, a specific set of Representational State Transfer (REST) APIs were created to communicate with the on-premise applications, effectively creating am identity management web service. A REST or RESTful API is an API that can communicate in almost every existing protocol. It should be appreciated that REST API itself is not a protocol, but an environment that employs standards, such as for example, Hypertext Transfer Protocol (HTTP), JavaScript Object Notation (JSON), Uniform Resource Locater (URL) Internet protocol, and Extensible Markup Language (XML). In an embodiment, the REST APIs include HTTP requests, such as but not limited to GET, POST, PATCH, AND DELETE. It should be appreciated that the innovative identity management environment is more efficient that an application running on-premise or using a virtual machine environment because it uses REST APIs. REST technology requires less bandwidth, which results in superior performance especially in the Internet environment. The innovative REST APIs residing on the web server allow the client device to communicate with it. Such innovatively configured web server receives requests from the client device and responds accordingly.

With reference to FIG. 7A-7AE, a schematic diagram of the commands for each of the APIs of FIGS. 6A-6C, the commends needed to perform each function, such as DELETE for example, are shown. For instance, in FIG. 7AD, a user can click on or select the red DELETE button, which is the button to delete user members or remove them from AD group, and the commands required to delete such user is shown. It should be appreciated that the commands required to perform the given function for each of the remaining functions listed in FIG. 6A-6C are shown and are not repeated here for brevity of understanding herein without obfuscating the description of the innovation. However, each of those commands are incorporated here in their entirety by this reference thereto and also are not meant to be limiting but are exemplary.

Thus, in accordance with an embodiment, the innovation provides a web service interface to the on-premise systems. With regard to the innovative identity management innovation, such web service interface interfaces with Active Directory as well as other legacy systems such as but not limited to mainframes, routers, e.g. AS100, and other devices.

Thus, in an embodiment, a file in the cloud, such as for example a Docker image, is configured to communicate through a REST API to the innovative Web service to activate the innovative container. It should be appreciated that this innovative application container environment communicates in a very secure way. Users do not have to open up ports on their firewall. The communication takes place over Secure Socket Layer (SSL). Because SSL is typically open and available, the innovation is configured such that a user can communicate from anywhere in the world to the on-premise system and manage such on-premise system as if the user were running it on-premise. For purposes of understanding herein, SSL is a secure protocol on top of HTTP between a client and a server that employs cryptographic techniques for encrypting the data transferred therebetween.

In an embodiment, a web service having specific REST API is configured to interface into identity management legacy code that has been being ported over to an agent. In an embodiment, such agent is a container application that is downloaded or installed on a compatible computer such as for example a Windows machine, and such agent is configured to control access to the AS100 and the other legacy or existing on-premise systems. As mentioned above and for example, the agent is not limited to being installed on the Windows machine, but can LDAP, for example.

In an embodiment, the identity-management web services reside in the cloud. In addition, an agent is provided that is communicating directly to the identity repositories, such as but not limited to LDAP, Active Directory, or a databases or other systems that exist on-premise.

Exemplary Identity Management Embodiments

An embodiment can be understood with reference to FIG. 1, a schematic diagram of an application container hosted environment for identity management. FIG. 1 depicts the user 102*a* from outside the local LAN 104 of the company (or other on-premise entity) and the user 102*b* from inside the local LAN 104. User 102*a,b* desires to logon to a cloud application or service 106. In the figure, examples of cloud applications are shown as familiar brand name application, but it should be understood that such specific cloud applications are by example only and are not meant to be limiting. It should further be appreciated that each of cloud applications 106 has previously obtained and deployed the REST APIs provided by the host application container system. Thus, in accordance with embodiments herein, when user 102*a,b* begins logging into one of cloud applications 106, user 102*a,b* sends the login request to host application container web server 108. The user input initiating the login process by user 102*a,b* is depicted by lead lines 110*a* and 110*b*, respectively. Communication channel 110*b* is shown going through the company's firewall. The user input reaches host application container web service 108 and the appropriate application container 112, depicted as logical devices, one with a whale as an example Docker image and container and the other as a SQL database, where the Docker image has caused the Docket container application to run. The emblem depicting Identity Anywhere Avatier Anywhere 114 represents that the application container is running the identity management application. Thus, in response to the user input the running identity management container application sends a corresponding login request to the identity management agent 116 that was previously installed or downloaded by the company. Lead lines 118 represent the login request originating from the user but intercepted by the identity management application container 112. Subsequently, agent 116 contains the actual identity management container application and is configured to communicate as shown via lead line 124 with the on-premise applications 120 and/or the active direct domain controllers 112 as shown via lead line 126 to authenticate and authorize user 102*a,b*. In an embodiment, agent 116 communicates with host application container web server 108 using the APIs, such as for example the REST APIs, described above. In an embodiment, agent 116 is already configured with identity management code to authenticate user 102*a,b*, as if it were an on-premise identity authentication application, itself. Put another way, agent 116 can contain an identity management application that was previously used to by the company to authenticate its users, but now ported to agent 116. The positive (or negative) authentication is relayed back to identity management application container 112 via the same communication channels but in the opposite direction. After receiving the positive authentication notification originating from agent 116, identity management application container 112 allows user 102*a,b* to logon to the desired cloud application of cloud applications 106.

Figure 2:
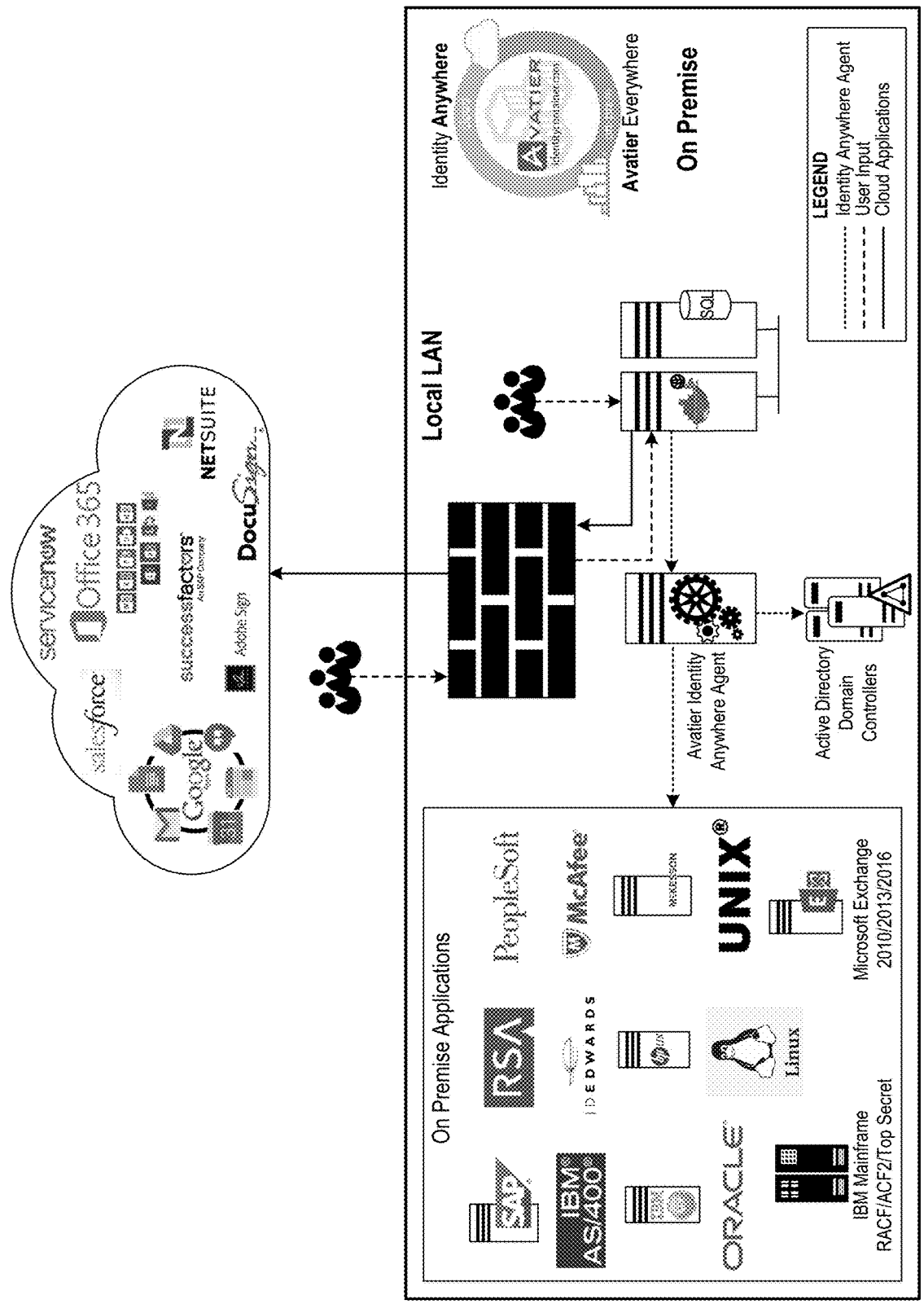
FIG. 2 is a schematic diagram of an application container on-premise environment for identity management, according to an embodiment.

An embodiment can be understood with reference to FIG. 2, a schematic diagram of an application container on-premise environment for identity management. This embodiment is similar to that of FIG. 1, except that the host application container web server 108 resides not in the cloud or on the web but on-premise of a specific company. The authentication flow remains the same, even when the user is outside of the local LAN.

Figure 3:
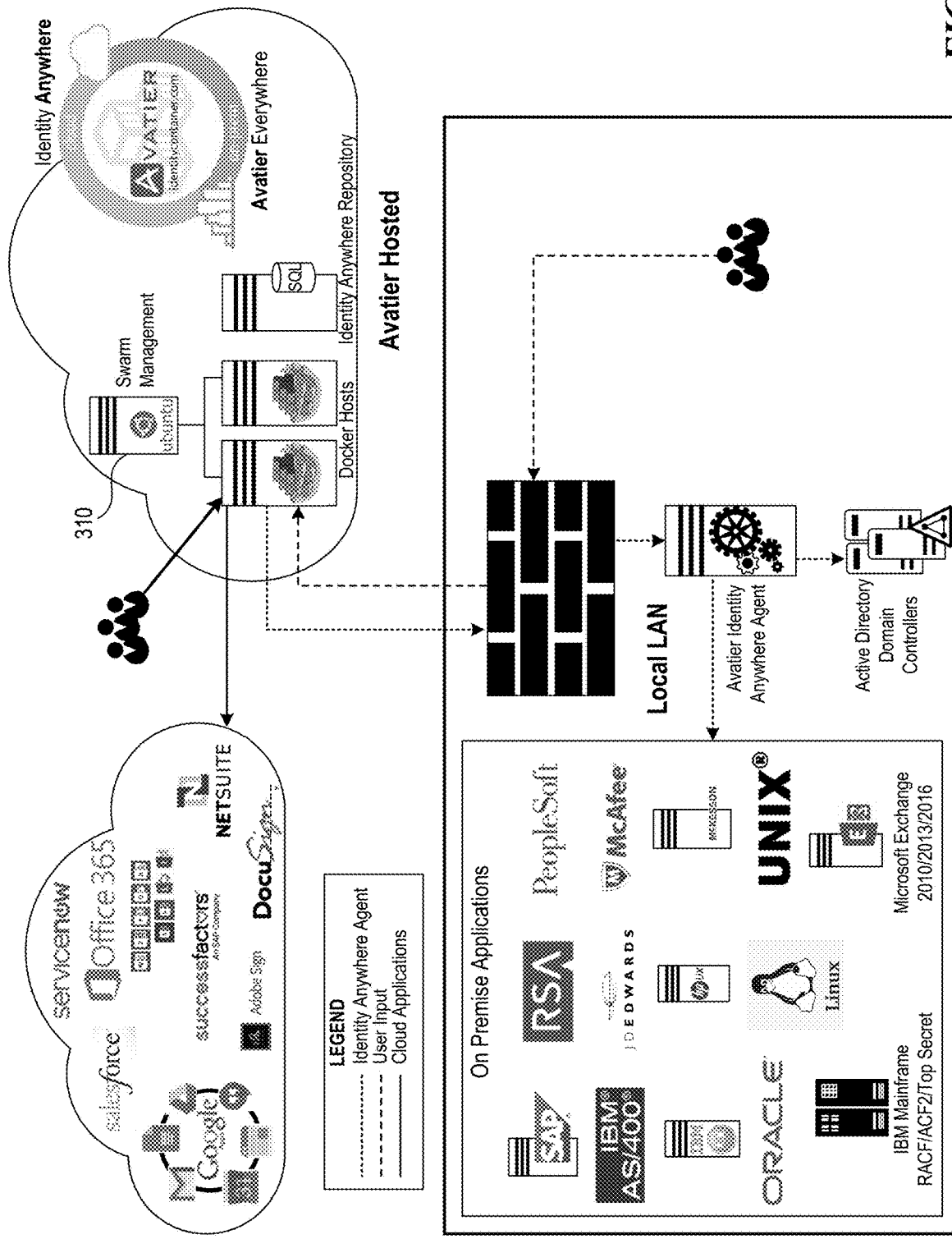
FIG. 3 is a schematic diagram of an application container swarm hosted environment for identity management, according to an embodiment.

An embodiment can be understood with reference to FIG. 3, a schematic diagram of an application container swarm hosted environment for identity management. FIG. 3 depicts an embodiment that is similar to that of FIG. 1, except that there are more than one application container hosts in host application container web server 108. The cluster load balancing of the multiple application container hosts is managed by a swarm management device 310. For the user, the flow is the same. This embodiment represents the scaling ability of the innovation, that many application containers can reside on one host.

Figure 4:
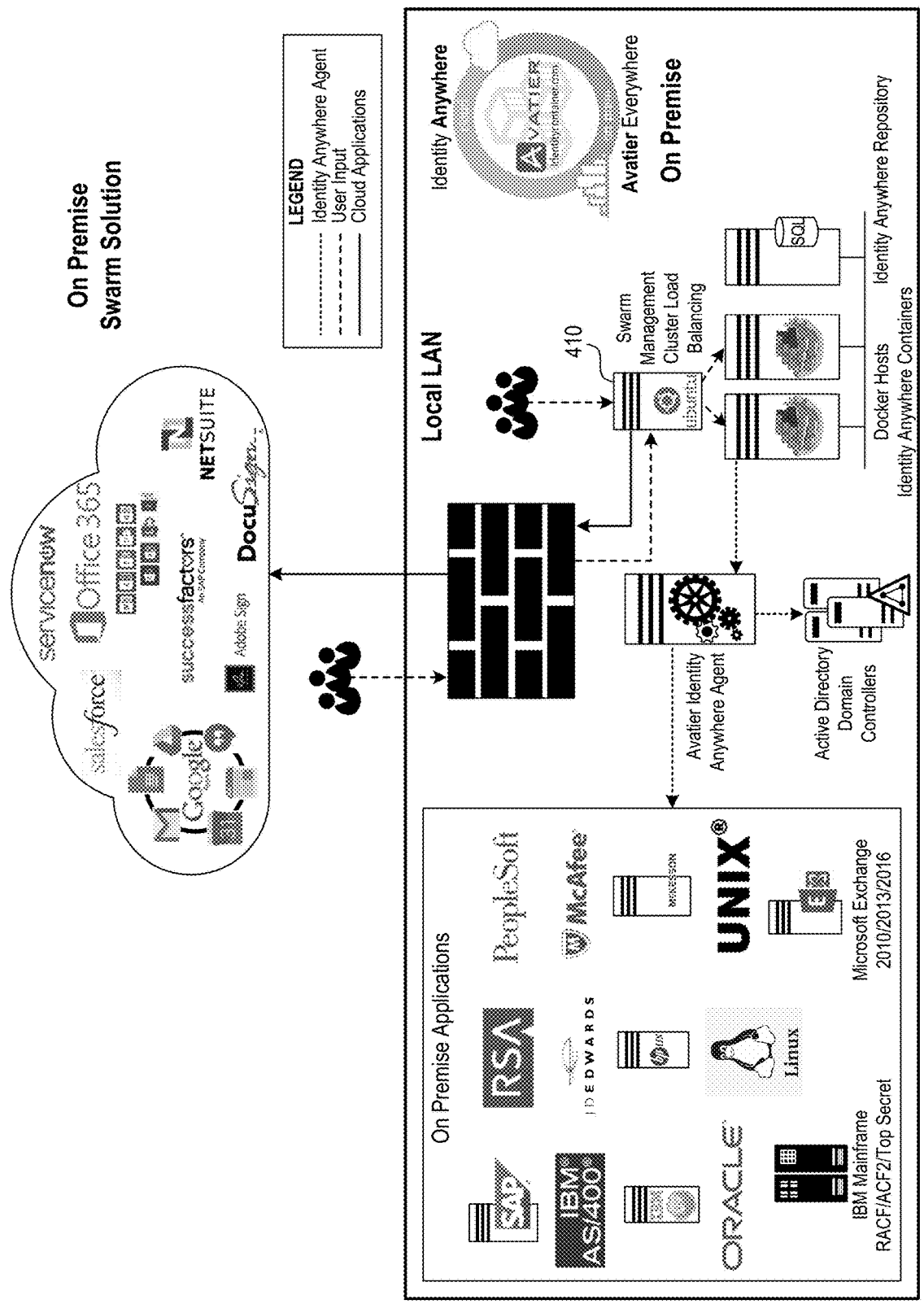
FIG. 4 is a schematic diagram of an application container swarm on-premise environment for identity management, according to an embodiment.

An embodiment can be understood with reference to FIG. 4, a schematic diagram of an application container swarm on-premise environment for identity management. The embodiment in FIG. 4 is similar to both FIG. 2 and FIG. 3, respectively, in that the host application container web server 108 resides on-premise and that there are more than one application container hosts in host application container web server 108, where the cluster load balancing of the multiple application container hosts is managed by a swarm management device 410.

Figure 5:
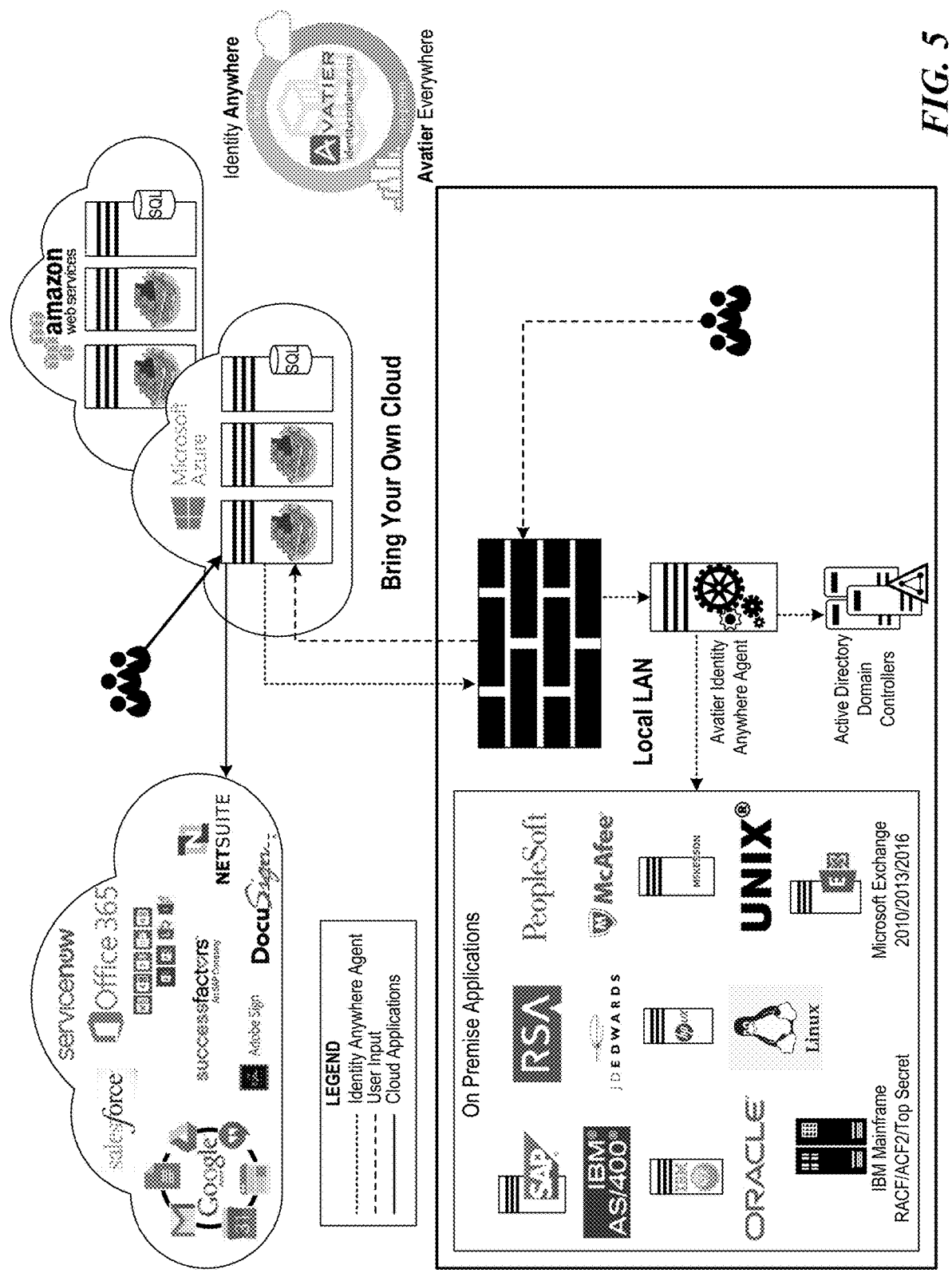
FIG. 5 is a schematic diagram of an application container swarm build-your-own-cloud-architecture environment for identity management, according to an embodiment.

An embodiment can be understood with reference to FIG. 5, a schematic diagram of an application container swarm in a build-your-own-cloud-architecture environment for identity management. The embodiment is similar to FIG. 1 and FIG. 3, except that the file initiating the running of the container resides on any cloud of one's choice, instead of the host application container web server 108.

Other Exemplary Embodiments

In an embodiment, the innovative identity management system is configured to manage (Rivest-Shamir-Adleman) RSA public-key cryptosystem tokens on an enterprise's on-premise application through the innovative agent. Further, the innovation is configured such that HID cards, proximity cards that facilitate proximity technology, can be managed. Further, the innovation is configured to allow managing any asset that can be communicated to on the other side if there is an API for the innovation us to talk to it.

Identity Management Container Application Allows Authentication to the Cloud

In an embodiment, a user can authenticate to an application in the cloud using his or her on-premise account identity related information, e.g. work account identity related information, without using third party technology or systems such as for example Federation authentication, single sign-on (SSO), or Security Assertion Markup Language (SAML). These and other third-party technologies allow a corporate directory to link up to public applications or systems such as for example Salesforce.com (San Francisco, Calif.), etc. In contrast thereto, embodiments herein, by way of the innovative agent, allow a user to use their credentials from the workplace, e.g. their password and ID that they use to logon to their Active Directory, to logon to the innovative web service to be further logged onto the target cloud application, without being involved with the third-party systems such as Federation, SAML, etc. In this scenario, the target cloud application or service had previously obtained and implemented the API from the innovative identity management container application system, so that the innovative system and the target cloud application or service could communicate via such API.

Thus, in accordance with embodiments herein, a user does not require another ID or password for access to or to get an account with the target cloud application or service. This innovation allows anybody in the world to connect up to any application, if the application provider used the APIs provided by this innovation. The user could just log on normally, without needing yet another ID and password.

Package into Application or Set of APIs

In an embodiment, a set of APIs is provided to cloud application or service providers, and the concept of single sign-on disappears. For instance, if a user realizes that a company providing a particular cloud application or service does not allow them to logon using their work credentials, the user can ask such company to obtain such APIs. It is contemplated that a user can logon to any cloud application using the same password that they use on-premise. Currently, any application, any service requires the user to generate a separate ID for logging onto their system. With embodiments herein using REST APIs, all of a user's ID/passwords for the various systems are using the corporate's ID/password for that user. In contrast, the other systems require a lot of hand-shaking and related activity. Here, a user installs the agent and is done. There is no requirement to support a standard per se. The innovative system is configured so that the user installs an agent, has a login that supports that agent, and is done.

Native Login—ID and Password Exist on-Premise

As mentioned above, the system is configured such that the user logs on to any cloud application with their native credentials. Importantly and innovatively, such password and user ID exist or reside in the user's company system, nowhere else. Thus, the user is not required to share their password with anyone or any other system. Put another way, the user is just saying: "I've authenticated myself, and I'm here." Thus, the innovation provides native login from anywhere to anywhere, where native login or logon refers to using the user's credentials or logon information stored on their on-premises systems as their logon information elsewhere.

Native login to cloud applications does not exist today.

An Example Machine Overview

Figure 8:
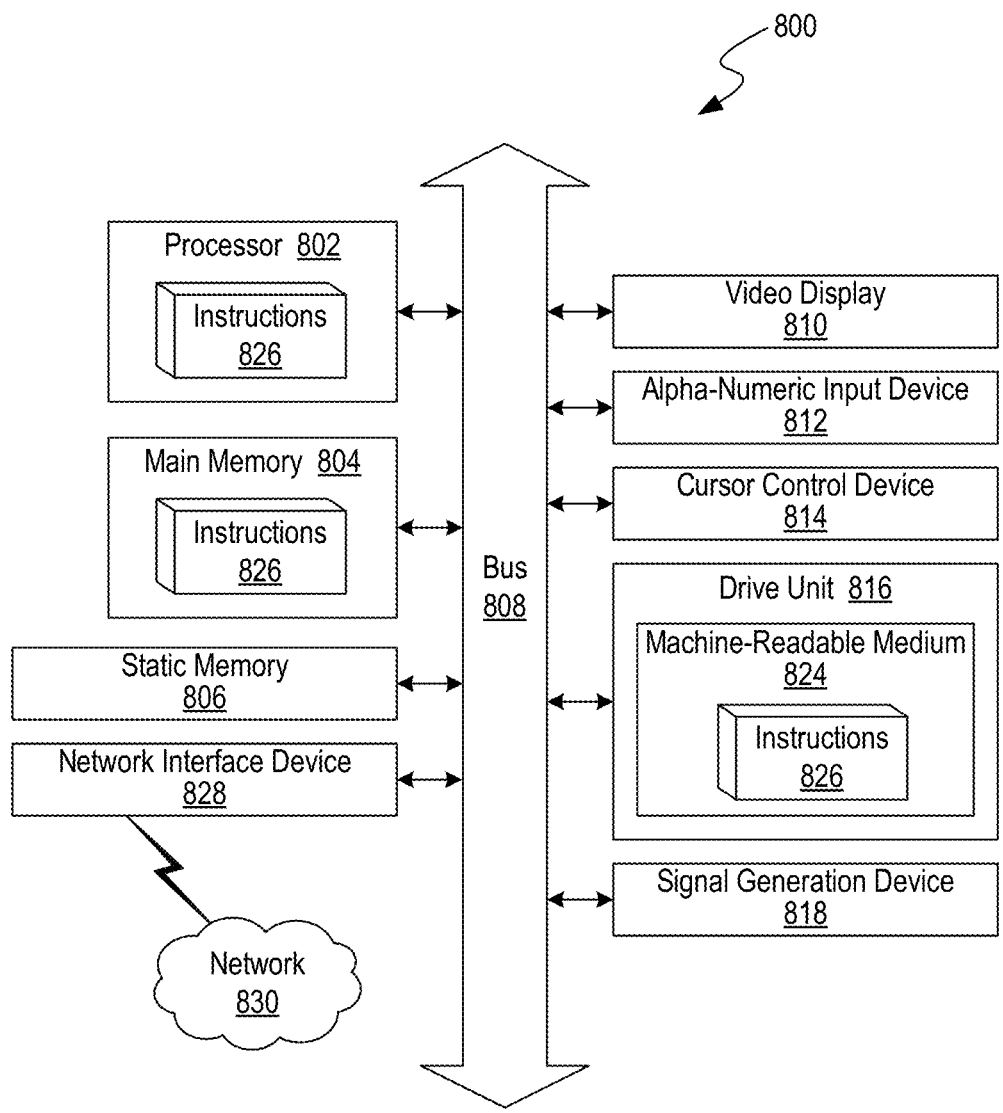
FIG. 8 is a block schematic diagram of a system in the exemplary form of a computer system according to an embodiment.

FIG. 8 is a block schematic diagram of a system in the exemplary form of a computer system 800 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 800 includes a processor 802, a main memory 804 and a static memory 806, which communicate with each other via a bus 808. The computer system 800 may further include a display unit 810, for example, a liquid crystal display (LCD) or a cathode ray tube (CRT). The computer system 800 also includes an alphanumeric input device 812, for example, a keyboard; a cursor control device 814, for example, a mouse; a disk drive unit 816, a signal generation device 818, for example, a speaker, and a network interface device 828.

The disk drive unit 816 includes a machine-readable medium 824 on which is stored a set of executable instructions, i.e. software, 826 embodying any one, or all, of the methodologies described herein below. The software 826 is also shown to reside, completely or at least partially, within the main memory 804 and/or within the processor 802. The software 826 may further be transmitted or received over a network 830 by means of a network interface device 828.

In contrast to the system 800 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing solutions that enable users, e.g. users on the go, to engage with applications on such internet-enabled or other network-enabled devices, servers, or clients. It further should be appreciated that one or more cloud computing embodiments include implementing the innovation using mobile devices, tablets, and the like, as such devices are becoming standard consumer devices.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A system for native authentication to access a resource, comprising:
   a display configured to display a resource in the cloud;
   an identity management container published to the cloud in either a private or public repository, wherein a user downloads said identity management container, and wherein said identity management container starts without requiring installation when downloaded by said user;
   said identity management container comprising an identity management container application processor configured to receive a user input request from a user for accessing the resource, configured to allow an authenticated user to access the resource, and configured to communicate with an identity management agent processor using Internet-related APIs for authenticating the user;
   a set of Internet-related APIs for the identity management container application processor to communicate with the identity management agent processor; and
   the identity management agent processor resident on an enterprise's network system, wherein the identity management agent processor is configured to communicate with one or more enterprise on-premise systems, to communicate with an active directory domain controller resident on the enterprise's network system, and to communicate with the identity management container application processor;
   wherein when the user logs into the resource the user sends the login request to a host application container web service, the user input reaches the host application container web service and an appropriate application container, in response to the user input the identity management container application sends a corresponding login request to an identity management agent processor which contains the identity management container processor;
   wherein the identity management container application processor is configured, in response to receiving the user input request for accessing the resource in the cloud, to allow the user to log onto the resource in the cloud by using a same logon information for accessing the one or more enterprise on-premise systems; and
   wherein one or more of the processors is a hardware processor.

2. The system of claim 1, wherein the user input request for accessing the resource originates from inside an enterprise network firewall.

3. The system of claim 1, wherein the user input request for accessing the resource originates from outside an enterprise network firewall.

4. The system of claim 1, wherein the Internet-related APIs are REST APIs.

5. The system of claim 1, wherein the Internet-related APIs include the following functions:
   to retrieve a directory domain;
   to get a random password that meets the domain's password policy;
   to get a list of organizational units;
   to search for a particular organizational unit;
   to retrieve an organizational unit from a given directory domain;
   to retrieve a single directory user;
   to retrieve multiple directory users;
   to patch a password;
   to change status of a user;
   to get tokengroups collection for a single directory user;
   to retrieve details of a specific directory user account;
   to retrieve a single string attribute value from a specific directory user;
   to update a single string attribute value from a specific directory user;
   for a given directory user, return string values for the given list of directory attributes;
   to retrieve a given list of directory attributes, for users that match a given partial LDAP filter;
   to search for a single user;
   to verify that the user can authenticate to the domain with a given password;
   to retrieve account information for a given user identifier;
   to retrieve password age information for a specific directory user;
   to retrieve password expiration information for a specific directory user;
   to retrieve email information for a given directory user;
   to get group membership information;
   to retrieve user account control information for a specific directory user;
   to retrieve a single directory group;
   to retrieve a list of base user information for a given directory group;
   to post a registry read for a computer;
   to post a registry for a computer;
   to remove a directory user from a directory group; and
   to add a directory user to a directory group.

6. The system of claim 1, wherein the identity management container application processor and the identity management agent processor communicate through a firewall on the enterprise's network.

7. The system of claim 1, wherein the enterprise's on-premise systems comprise any of:
   an executable application;
   a mainframe;
   a router; and
   an employee asset.

8. The system of claim 7, wherein the on-premise systems further comprise existing enterprise rules and attributes from spreadsheets, human resources systems, or application programming interfaces.

9. The system of claim 1, wherein the identity management container application processor is configured to be portable and configured to reside and execute on a cloud environment, on-premise; and on a private cloud instance.

10. The system of claim 1, wherein the resource is any of an application of the enterprise, an enterprise asset, or a cloud application.

11. The system of claim 1, wherein user credentials of the user for an on-premise resource are used to enable the user to access the resource.

12. The system of claim 11, wherein the user credentials are stored on the enterprise's on-premise systems.

13. The system of claim 1, wherein the container is a Docker container.

14. The system of claim 1, further comprising a plurality of containers and a swarm management cluster load balancing processor for balancing network traffic across the plurality of containers.

15. The system of claim 1, wherein the container processor is programmable by a user administrator of the enterprise to set enterprise rules and attributes for user provisioning.

16. A method for native authentication to access a resource, comprising:
   displaying a resource in the cloud
   publishing an identity management container to the cloud in either a private or public repository;
   a user downloading said identity management container;
   said identity management container starting without requiring installation when downloaded by said user;
   said identity management container comprising an identity management container application processor configured to receive a user input request from a user for accessing the resource in the cloud, configured to allow an authenticated user to access the resource, and configured to communicate with an identity management agent processor using Internet-related APIs for authenticating the user;
   providing a set of Internet-related APIs for the identity management container application processor to communicate with an identity management agent; and
   providing the identity management agent processor resident on an enterprise's network system, wherein the identity management agent processor is configured to communicate with one or more enterprise on-premise systems, to communicate with an active directory domain controller resident on the enterprise's network system, and to communicate with the identity management container application processor;
   wherein when the user logs into the resource the user sends the login request to a host application container web service, the user input reaches the host application container web service and an appropriate application container, in response to the user input the identity management container application sends a corresponding login request to an identity management agent processor which contains the identity management container processor;
   wherein the identity management container application processor is configured, in response to receiving the user input request for accessing the resource in the cloud, to allow the user to log onto the resource in the cloud by using a same logon information for accessing the one or more enterprise on-premise systems; and
   wherein one or more of the processors is a hardware processor.

17. The method of claim 16, wherein the Internet-related APIs are REST APIs.

18. The method of claim 16, wherein the identity management container application processor is configured to be portable and configured to reside and execute on a cloud environment, on-premise; and on a private cloud instance.

19. The method of claim 16, wherein user credentials of the user for an on-premise resource are used to enable the user to access the resource and wherein the user credentials are stored on the enterprise's on-premise systems.

20. A non-transitory digital storage medium having a computer program stored thereon to perform the method for native authentication to access a resource, said method comprising:
   displaying a resource in the cloud
   publishing an identity management container to the cloud in either a private or public repository;
   a user downloading said identity management container;
   said identity management container starting without requiring installation when downloaded by said user;
   said identity management container comprising an identity management container application processor configured to receive a user input request from a user for accessing the resource in the cloud, configured to allow an authenticated user to access the resource, and configured to communicate with an identity management agent processor using Internet-related APIs for authenticating the user;
   providing a set of Internet-related APIs for the identity management container application processor to communicate with an identity management agent; and
   providing the identity management agent processor resident on an enterprise's network system, wherein the identity management agent processor is configured to communicate with one or more enterprise on-premise systems, to communicate with an active directory domain controller resident on the enterprise's network system, and to communicate with the identity management container application processor;
   wherein when the user logs into the resource the user sends the login request to a host application container web service, the user input reaches the host application container web service and an appropriate application container, in response to the user input the identity management container application sends a corresponding login request to an identity management agent processor which contains the identity management container processor;
   wherein the identity management container application processor is configured, in response to receiving the user input request for accessing the resource in the cloud, to allow the user to log onto the resource in the cloud by using a same logon information for accessing the one or more enterprise on-premise systems;
   wherein one or more of the processors is a hardware processor; and
   when said computer program is run by a computer.

* * * * *